United States Patent
Oiwa et al.

(10) Patent No.: US 8,851,681 B2
(45) Date of Patent: Oct. 7, 2014

(54) ILLUMINATION DEVICE AND DISPLAY UNIT

(75) Inventors: Tatsuya Oiwa, Tokyo (JP); Kazuyuki Takahashi, Kanagawa (JP); Koji Miura, Tokyo (JP)

(73) Assignee: Sony Corporation, Tokyo (JP)

( * ) Notice: Subject to any disclaimer, the term of this patent is extended or adjusted under 35 U.S.C. 154(b) by 227 days.

(21) Appl. No.: 13/253,358

(22) Filed: Oct. 5, 2011

(65) Prior Publication Data

US 2012/0092624 A1  Apr. 19, 2012

(30) Foreign Application Priority Data

Oct. 18, 2010  (JP) .................................. 2010-233855

(51) Int. Cl.
| | |
|---|---|
| G03B 21/14 | (2006.01) |
| G03B 21/20 | (2006.01) |
| H04N 9/31 | (2006.01) |
| G03B 33/12 | (2006.01) |
| G02B 27/48 | (2006.01) |
| G03B 33/06 | (2006.01) |

(52) U.S. Cl.
CPC .............. *G02B 27/48* (2013.01); *G03B 21/208* (2013.01); *G03B 21/2033* (2013.01); *H04N 9/3111* (2013.01); *G03B 33/12* (2013.01); *H04N 9/3152* (2013.01); *G03B 33/06* (2013.01)
USPC .................................. 353/20; 353/31; 353/38

(58) Field of Classification Search
USPC .................. 353/20, 30, 31, 38; 349/5, 7, 8, 9; 385/553, 555, 561, 559, 231, 234, 235; 355/67; 348/742, 743, 771
See application file for complete search history.

(56) References Cited

U.S. PATENT DOCUMENTS

| 7,995,298 | B2 * | 8/2011 | Chen ............................. 359/831 |
|---|---|---|---|
| 8,403,496 | B2 * | 3/2013 | Qu et al. ........................ 353/39 |
| 2009/0002638 | A1 * | 1/2009 | Lee et al. ....................... 353/31 |
| 2009/0128451 | A1 | 5/2009 | Tokui | |
| 2009/0310087 | A1 | 12/2009 | Itoh et al. | |

(Continued)

FOREIGN PATENT DOCUMENTS

| JP | 2004-013021 | 1/2004 |
|---|---|---|
| JP | 2005-352078 | 12/2005 |

(Continued)

OTHER PUBLICATIONS

Japanese Office Action issued Feb. 12, 2014 in corresponding Japanese Patent Application No. 2010-233855.

*Primary Examiner* — William C Dowling
(74) *Attorney, Agent, or Firm* — K&L Gates LLP

(57) ABSTRACT

An illumination device includes: a light source section having plural kinds of light sources, in which the light sources emits light beams having different wavelengths; a parallelizing optical system parallelizing each of the light beams entered from the light sources, and allowing each of the parallelized light beams to exit therefrom; a light path unifying optical system unifying the parallelized light beams exited from the parallelizing optical system into a single light path; an expanding optical system expanding a beam diameter of each of the parallelized light beams unified into the single light path, and allowing each of the expanded and parallelized light beams to exit therefrom; and a uniformizing optical system uniformizing an in-plane intensity distribution in each of the expanded and parallelized light beams exited from the expanding optical system.

15 Claims, 6 Drawing Sheets

(56) References Cited

U.S. PATENT DOCUMENTS

| | | |
|---|---|---|
| 2009/0323027 A1* | 12/2009 | Uchikawa .................. 353/31 |
| 2010/0053565 A1* | 3/2010 | Mizushima et al. ........... 353/38 |
| 2010/0245773 A1 | 9/2010 | Arita |
| 2011/0043764 A1* | 2/2011 | Narikawa .................. 353/31 |
| 2011/0043768 A1 | 2/2011 | Nakayama et al. |
| 2011/0075108 A1* | 3/2011 | Kojima et al. ............... 353/38 |
| 2013/0021581 A1* | 1/2013 | Takahashi et al. ........... 353/31 |
| 2013/0088652 A1* | 4/2013 | Yasui ........................ 349/5 |

FOREIGN PATENT DOCUMENTS

| | | |
|---|---|---|
| JP | 2009-180999 | 8/2009 |
| JP | 2009-288520 | 12/2009 |
| JP | 2010-32797 | 2/2010 |
| JP | 2010-197716 | 9/2010 |
| JP | 3174810 | 4/2012 |
| WO | 2007/023681 | 3/2007 |
| WO | 2007116935 | 10/2007 |
| WO | 2009/028438 | 3/2009 |
| WO | 2010/116727 | 10/2010 |

* cited by examiner

ILLUMINATION DEVICE AND DISPLAY UNIT

CROSS REFERENCES TO RELATED APPLICATIONS

The present application claims priority to Japanese Priority Patent Application JP 233855 filed in the Japan Patent Office on Oct. 18, 2010, the entire content of which is hereby incorporated by reference.

BACKGROUND

The present disclosure relates to an illumination device provided with plural kinds of light sources that emit light beams having different wavelengths, and to a display unit which performs picture displaying using the illumination device.

An optical module, which is one of major components in a projector (or a "projection display unit"), is generally structured by an illumination optical system (or an "illumination device") which includes a light source, and a projection optical system (or an "image projecting optical system") which includes a light modulation device. In recent years, a small-sized (a palm-sized) and light-weighted portable projector often referred to as a microprojector has gradually been in widespread use in a field of the projector. The currently-available microprojector mainly uses light-emitting diodes (LEDs) for the light source of the illumination device.

On the other hand, much attention has been focused nowadays on the use of a laser as a new light source for the illumination device. For example, a projector utilizing a gas laser has been known as a projector which uses laser beams of three primary colors of red (R), green (G), and blue (B). The projector which uses the laser for the light source has been proposed, for example, in each of International Application Publication No. 2007/116935, Japanese Unexamined Patent Application Publication No. 2009-288520, and Japanese Unexamined Patent Application Publication No. 2010-32797, for example. The use of the laser for the light source makes it possible to achieve a projector having a wider range of color reproducibility and lower power consumption.

SUMMARY

The illumination device in the projector according to the International Application Publication No. 2007/116935 is disadvantageous in that a large-scaled (large-sized) optical system (a light path unifying optical system) has to be constructed, in order to perform a light path unification (a color composition) of light beams emitted from respective monochromatic laser light sources of three primary colors and to use those light beams for picture displaying. More specifically, the light path unifying optical system (such as a dichroic prism and a dichroic mirror) having a size corresponding to the number of the light sources has to be used, or the number of the light path unifying optical systems has to correspond to the number of the light sources. One reason is that it is necessary in the light path unifying optical system to have a size for allowing light having a high numerical aperture (a high aperture ratio) to be introduced therein or to be incident thereon, in order to avoid a decrease in a light-use efficiency (to avoid a light loss) in performing the light path unification. Thus, it is difficult for the illumination device according to the International Application Publication No. 2007/116935 to achieve reduction in size and weight while improving the light-use efficiency.

The illumination device in the projector according to each of the Japanese Unexamined Patent Application Publications No. 2009-288520 and No. 2010-32797 has a configuration in which a collimator lens is provided in each region between each of monochromatic laser sources of three primary colors and a light path unifying optical system (a dichroic prism). This configuration allows light beams entered from the monochromatic light sources to be converted into parallelized light beams in the collimator lenses, respectively, and then allows each parallelized light beam to be subjected to a light path unification in the light path unifying optical system. Hence, the illumination device according to each of the Japanese Unexamined Patent Application Publications No. 2009-288520 and No. 2010-32797 is likely to achieve the smaller light path unifying optical system while improving a light-use efficiency (while maintaining a high light-use efficiency), since beam diameters in performing the light path unification become small.

Incidentally, in addition to the smaller size and the lighter weight of the device, a high expectation is placed on higher performance (higher image quality) in the projector industry of recent years. Thus, it is also important to further effectively reduce unevenness in illumination (such as a luminance non-uniformity and illuminance non-uniformity of illumination light). In other words, what is desired is an illumination device that allows to effectively reduce the luminance non-uniformity (illuminance non-uniformity) of the illumination light while achieving the smaller size and improving the light-use efficiency, and a display unit using the same.

It is desirable to provide an illumination device and a display unit, capable of effectively reducing a luminance non-uniformity of illumination light while achieving a smaller size and improving a light-use efficiency.

An illumination device according to an embodiment includes: a light source section having plural kinds of light sources, the light sources emitting light beams having different wavelengths; a parallelizing optical system parallelizing each of the light beams entered from the light sources, and allowing each of the parallelized light beams to exit therefrom; a light path unifying optical system unifying the parallelized light beams exited from the parallelizing optical system into a single light path; an expanding optical system expanding a beam diameter of each of the parallelized light beams unified into the single light path, and allowing each of the expanded and parallelized light beams to exit therefrom; and a uniformizing optical system uniformizing an in-plane intensity distribution in each of the expanded and parallelized light beams exited from the expanding optical system.

A display unit according to an embodiment includes: an illumination device emitting illumination light; and a light modulation device modulating, based on a picture signal, the illumination light derived from the illumination device. The illumination device including: a light source section having plural kinds of light sources, the light sources emitting light beams having different wavelengths; a parallelizing optical system parallelizing each of the light beams entered from the light sources, and allowing each of the parallelized light beams to exit therefrom; a light path unifying optical system unifying the parallelized light beams exited from the parallelizing optical system into a single light path; an expanding optical system expanding a beam diameter of each of the parallelized light beams unified into the single light path, and allowing each of the expanded and parallelized light beams to exit therefrom; and a uniformizing optical system uniformizing an in-plane intensity distribution in each of the expanded and parallelized light beams exited from the expanding optical system.

In the illumination device and the display unit according to the embodiments, each of the light beams entered from the light sources in the light source section is parallelized in the parallelizing optical system, following which the parallelized light beams are unified into the single light path in the light path unifying optical system. Thus, the beam diameters when performing the light path unification become small, making it possible to allow the light path unifying optical system to be small in size while maintaining high light-use efficiency, as compared with a case where respective exit light beams from light sources, which are diffusion light beams or divergent light beams, are subjected "as they are" to a light path unification. Also, the parallelized light beams following the light path unification are subjected to the expansion of the beam diameters thereof in the expanding optical system, following which each of the expanded and parallelized light beams enters the uniformizing optical system, by which the in-plane intensity distribution in each of the expanded and parallelized light beams is uniformized. Thus, the beam diameters are expanded when uniformizing the in-plane intensity distribution, making it possible to uniformize the in-plane intensity distribution further effectively as compared with a case where the in-plane intensity distribution is uniformized in a state in which the beam diameter is small (as compared with a case where the in-plane intensity distribution is uniformized without expanding the beam diameters).

An illumination device according to another embodiment includes: a light source section having plural kinds of light sources, the light sources emitting light beams having different wavelengths; a coupling optical system reducing a beam divergence ratio of each of the light beams entered from the light sources, and allowing each of the ratio-reduced light beams to exit therefrom as divergent light beams; a light path unifying optical system unifying the divergent light beams exited from the coupling optical system into a single light path; a parallelizing optical system parallelizing each of the divergent light beams exited from the light path unifying optical system, and allowing each of the parallelized light beams to exit therefrom; and a uniformizing optical system uniformizing an in-plane intensity distribution in each of the parallelized light beams exited from the parallelizing optical system.

A display unit according to another embodiment includes: an illumination device emitting illumination light; and a light modulation device modulating, based on a picture signal, the illumination light derived from the illumination device. The illumination device including: a light source section having plural kinds of light sources, the light sources emitting light beams having different wavelengths; a coupling optical system reducing a beam divergence ratio of each of the light beams entered from the light sources, and allowing each of the ratio-reduced light beams to exit therefrom as divergent light beams; a light path unifying optical system unifying the divergent light beams exited from the coupling optical system into a single light path; a parallelizing optical system parallelizing each of the divergent light beams exited from the light path unifying optical system, and allowing each of the parallelized light beams to exit therefrom; and a uniformizing optical system uniformizing an in-plane intensity distribution in each of the parallelized light beams exited from the parallelizing optical system.

In the illumination device and the display unit according to other embodiments, each of the light beams entered from the light sources in the light source section is reduced in the beam divergence ratio thereof in the coupling optical system and is allowed to exit therefrom as the divergent light beams, following which the divergent light beams are unified into the single light path in the light path unifying optical system. Thus, the beam diameters when performing the light path unification become small, making it possible to allow the light path unifying optical system to be small in size while maintaining high light-use efficiency, as compared with a case where respective exit light beams from light sources are subjected to a light path unification without involving the coupling optical system. Also, each of the divergent light beams following the light path unification is parallelized in the parallelizing optical system, following which each of the parallelized light beams enters the uniformizing optical system, by which the in-plane intensity distribution in each of the parallelized light beams is uniformized. Thus, when uniformizing the in-plane intensity distribution, the light beams subjected thereto are the parallelized light beams which have been increased further in the beam diameters, making it possible to uniformize the in-plane intensity distribution further effectively as compared with a case where the in-plane intensity distribution is uniformized in a state in which the light beams do not travel as the diffusion light beams or the divergent light beams.

According to the illumination device and the display unit of the embodiments, each of the light beams entered from the light sources in the light source section is parallelized, following which the parallelized light beams are unified into the single light path. This makes it possible to allow the light path unifying optical system to be small in size while maintaining high light-use efficiency. Also, the parallelized light beams following the light path unification are subjected to the expansion of the beam diameters thereof, following which the in-plane intensity distribution in each of the expanded and parallelized light beams is uniformized, making it possible to uniformize the in-plane intensity distribution further effectively. Therefore, it is possible to effectively reduce a luminance non-uniformity of illumination light (it is possible to improve display quality) while achieving a smaller size and improving a light-use efficiency.

According to the illumination device and the display unit of another embodiments, each of the light beams entered from the light sources in the light source section is reduced in the beam divergence ratio thereof and is allowed to exit as the divergent light beams, following which the divergent light beams are unified into the single light path. This makes it possible to allow the light path unifying optical system to be small in size while maintaining high light-use efficiency. Also, each of the divergent light beams following the light path unification is parallelized, following which the in-plane intensity distribution in each of the parallelized light beams is uniformized, making it possible to uniformize the in-plane intensity distribution further effectively. Therefore, it is possible to effectively reduce a luminance non-uniformity of illumination light (it is possible to improve display quality) while achieving a smaller size and improving a light-use efficiency.

It is to be understood that both the foregoing general description and the following detailed description are exemplary, and are intended to provide further explanation as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles.

DETAILED DESCRIPTION

In the following, embodiments will be described in detail with reference to the accompanying drawings. The description will be given in the following order.
1. First Embodiment (an embodiment in which collimator lenses and an expander lens are combined)
2. Modifications
First Modification (an embodiment having a retarder provided in an illumination device)
Second Modification (an embodiment having a front monitor and a controlling section)
3. Second Embodiment (an embodiment in which coupling lenses and a collimator lens are combined)

First Embodiment

Overall Configuration of Display Unit 3

Figure 1:
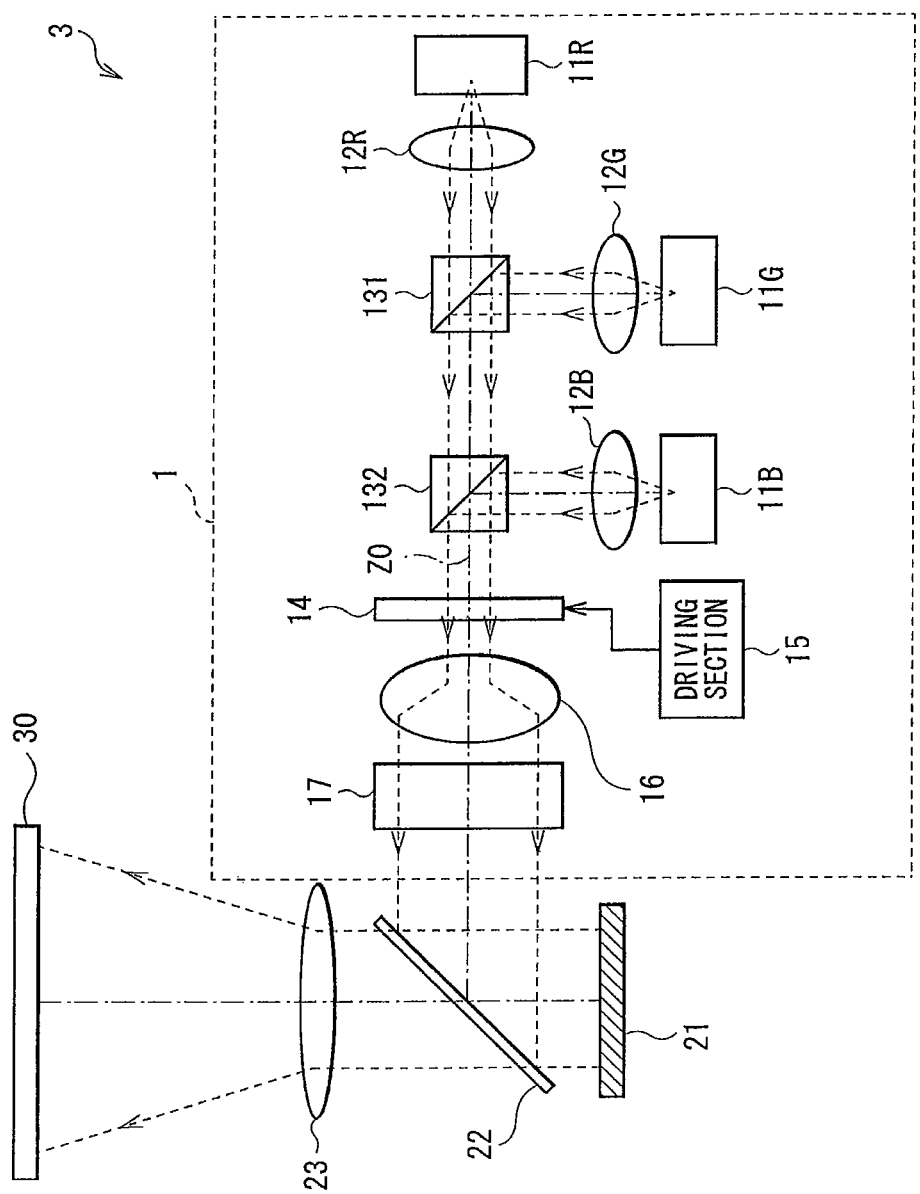
FIG. 1 illustrates an overall configuration of a display unit according to a first embodiment.

FIG. 1 illustrates an overall configuration of a display unit (a display unit 3) according to a first embodiment. The display unit 3 is a projection display unit which projects a picture (picture light) onto a screen 30 (a projection plane). The display unit 3 is provided with an illumination device 1, and an optical system (a displaying optical system) for performing a picture displaying by using illumination light derived from the illumination device 1.

[Illumination Device 1]

The illumination device 1 is provided with a red laser source 11R, a green laser source 11G, a blue laser source 11B, collimator lenses 12R, 12G, and 12B, dichroic prisms 131 and 132, an optical element 14, a driving section 15, an expander lens 16, and a fly-eye lens 17. It is to be noted that, in the following, "Z0" and a dashed line with an arrow in the drawings indicate an optical axis and a light path (a light path at an edge of a beam diameter of a light beam), respectively.

The red, green, and blue laser sources 11R, 11G, and 11B are three kinds of light sources that emit red laser light, green laser light, and blue laser light, respectively. These laser sources structure a light source section, and the three kinds of light sources are each configured by a laser light source in this embodiment. Each of the red laser source 11R, the green laser source 11G, and the blue laser source 11B may include a laser light source such as, but not limited to, a semiconductor laser source and a solid-state laser source. In one embodiment where each of the laser sources is the semiconductor laser source, the red laser light, the green laser light, and the blue laser light have wavelengths $\lambda r$, $\lambda g$, and $\lambda b$ of approximately 600 nm to 700 nm, 500 nm to 600 nm, and 400 nm to 500 nm, respectively. Alternatively, a combination of the laser source and an element such as a second harmonic generation (SHG) wavelength converting device, which uses an element such as a nonlinear optical crystal to generate a second harmonic, may be employed to structure each of the red laser source 11R, the green laser source 11G, and the blue laser source 11B.

The collimator lenses 12R and 12G serve to collimate (convert into parallel lights or "parallelize") the red laser light emitted from the red laser source 11R and the green laser light emitted from the green laser source 11G, respectively, and couple the thus-collimated laser lights to the dichroic prism 131. Likewise, the collimator lens 12B serves to collimate (convert into parallel light or "parallelizes") the laser light emitted from the blue laser source 11B, and couple the thus-collimated light to the dichroic prism 132. That is, the collimator lenses 12R, 12G, and 12B serve to allow the respective incident lights (the red, the green, and the blue laser lights) derived from the three types of laser sources (the red, the green, and the blue laser sources 11R, 11G, and 11B) to exit therefrom individually as parallel lights. Thus, the illumination device 1 has the same number of collimator lenses (three collimator lenses 12R, 12G, and 12B in this embodiment although not limitative) as that of the light sources (three in this embodiment although not limitative). In one embodiment, the collimator lenses 12R, 12G, and 12B correspond to an illustrative example of a "parallelizing optical system".

The dichroic prism 131 selectively allows the red laser light, having been parallelized by the collimator lens 12R and incident thereon, to transmit therethrough, and selectively allows the green laser light, having been parallelized by the collimator lens 12G and incident thereon, to be reflected therefrom. The dichroic prism 132 selectively allows the red laser light and the green laser light exited from the dichroic prism 131 to transmit, and selectively allows the blue laser light, having been parallelized by the collimator lens 12B and incident thereon, to be reflected therefrom. With this configuration, color composition (light path unification) is performed on the red laser light, the green laser light, and the blue laser light. In other words, the dichroic prisms 131 and 132 as a whole perform the light path unification on the respective parallel lights exited from the collimator lenses 12R, 12G, and 12B into a single light path. In one embodiment, the dichroic prisms 131 and 132 correspond to an illustrative example of a "light path unifying optical system".

The optical element 14 serves to reduce a speckle noise (an interference pattern) described later, and allows the laser lights traveling on the optical axis Z0 illustrated in the drawings to pass therethrough. The optical element 14 is located at a position which is on the light paths and on the exit side of each of the dichroic prisms 131 and 132 (more specifically, on the exit side of the dichroic prism 132). In other words, the optical element 14 is disposed on the light paths between the dichroic prism 132 and the expander lens 16 in this embodiment. The optical element 14 can be, for example but not limited to, a prism array, a diffractive element, or a lens.

The driving section 15 oscillates (performs microvibration of) the optical element 14 in a predetermined direction within a plane orthogonal to the optical axis Z0 (such as in one direction, in two directions, and in a rotation direction), for example. Alternatively, the driving section 15 oscillates or performs the microvibration of the optical element 14 along the optical axis Z0. The driving section 15 is configured by an element such as a coil and a permanent magnet (a permanent magnet made by materials such as neodymium (Nd), iron (Fe), and boron (B), for example).

The expander lens 16 is disposed on the light paths between the optical element 14 and the fly-eye lens 17. The expander lens 16 increases (expands) a beam diameter of each of the parallel lights that have been subjected to the light path unification in the dichroic prisms 131 and 132 and have been exited from the optical element 14, and then allows those parallel lights to exit therefrom. Thereby, the respective parallel lights, each of whose beam diameter is expanded, are allowed to enter the fly-eye lens 17. In one embodiment, the expander lens 16 corresponds to an illustrative example of an "expanding optical system".

The fly-eye lens 17 is an optical member (an integrator) in which a plurality of lenses are two-dimensionally arranged on a substrate. The fly-eye lens 17 spatially divides an incident light beam in accordance with the array of the lenses, and allows the divided light beams to exit therefrom. Thereby, the exit light from the fly-eye lens 17 is uniformized (an intensity distribution within a plane is uniformized), and is allowed to exit from the fly-eye lens 17 as illumination light. In other words, the fly-eye lens 17 uniformizes the in-plane intensity distribution of each parallel light (i.e., the parallel lights each having the expanded beam diameter) exited from the expander lens 16. In one embodiment, the fly-eye lens 17 corresponds to an illustrative example of a "uniformizing optical system".

[Displaying Optical System]

The displaying optical system mentioned before is configured by a polarization beam splitter 22, a reflection liquid crystal device 21, and a projection lens 23 (a projection optical system).

The polarization beam splitter 22 is an optical member which selectively allows a specific polarized light (for example, p-polarized light) to transmit therethrough as well as selectively allows another polarized light (for example, s-polarized light) to be reflected therefrom. Thereby, the illumination light (for example, s-polarized light) from the illumination device 1 is selectively reflected to enter the reflection liquid crystal device 21, while the picture light exited from the reflection liquid crystal device 21 (for example, p-polarized light) is selectively transmitted to enter the projection lens 23.

The reflection liquid crystal device 21 is a light modulation device which reflects the illumination light derived from the illumination device 1 while modulating the same based on picture signals supplied from an unillustrated displaying control section to allow the picture light to be exit therefrom. Here, the reflection liquid crystal device 21 so performs the reflection that the respective polarized lights at the time of incidence thereon and at the time of exit therefrom become different from each other (for example, s-polarized light or p-polarized light). The reflection liquid crystal device 21 can be a liquid crystal device such as an LCOS (Liquid Crystal on Silicon).

The projection lens 23 projects (or projects in an enlarged fashion) the illumination light (the picture light), which has been modulated by the reflection liquid crystal device 21, onto the screen 30.

[Operations and Advantages of Display Unit 3]

1. Displaying Operation

In the display unit 3, the lights (the laser lights) emitted from the red, the green, and the blue laser sources 11R, 11G, and 11B are collimated by the collimator lenses 12R, 12G, and 12B to become the parallel lights, respectively. The respective laser lights (the red, the green, and the blue laser lights), which have been converted into the parallel lights in a manner as described above, are then subjected to the color composition (the light path unification) by the dichroic prisms 131 and 132. Each of the parallel lights, to each of which the light path unification has been performed, then passes through the optical element 14. Then, the parallel lights become the parallel lights each having the beam diameter expanded by the expander lens 16, which are then incident on the fly-eye lens 17. The lights incident thereon are uniformized by the fly-eye lens 17 (the intensity distribution within a plane is uniformized), and exit therefrom as the illumination light.

The illumination light is then selectively reflected by the polarization beam splitter 22 to enter the reflection liquid crystal device 21. In the reflection liquid crystal device 21, the light having entered the reflection liquid crystal device 21 is reflected while being modulated based on the picture signals, so as to exit therefrom as the picture light. The picture light emitted from the reflection liquid crystal device 21 is allowed to transmit through the polarization beam splitter 22 selectively since the respective polarized lights when being input and output are different from each other. The picture light having transmitted through the polarization beam splitter 22 then enters the projection lens 23. The light incident thereon (the picture light) is projected (projected in an enlarged fashion) onto the screen 30 by the projection lens 23.

The red laser source 11R, the green laser source 11G, and the blue laser source 11B sequentially emit (pulsed light-emission) in a time-divisional fashion to emit the laser lights (the red, the green, and the blue laser lights), respectively. Based on the picture signals of respective color components (a red component, a green component, and a blue component), the laser lights having the colors corresponding thereto are sequentially modulated in a time-divisional fashion in the reflection liquid crystal device 21. Thus, color picture displaying based on the picture signals is performed in the display unit 3.

2. Operation of Illumination Device 1

Operation of the illumination device 1 according to the first embodiment will now be described in comparison to a comparative example.

2-1. Comparative Example

Figure 2:
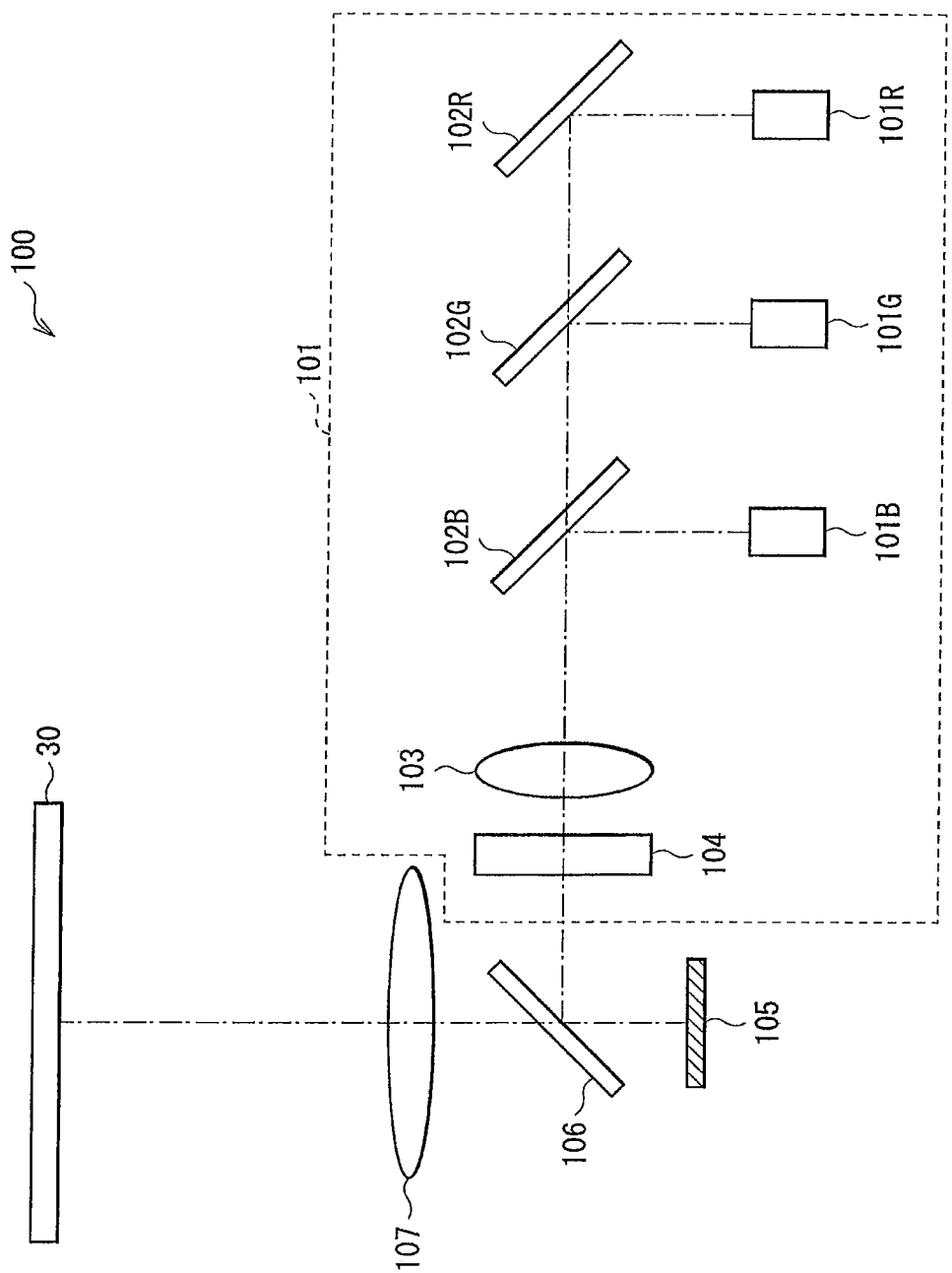
FIG. 2 illustrates an overall configuration of a display unit according to a comparative example.

FIG. 2 illustrates an overall configuration of a display unit (a display unit 100) according to the comparative example. As in the display unit 3 of the first embodiment, the display unit 100 according to the comparative example is a projection display unit which projects picture light onto the screen 30. The display unit 100 is provided with an illumination device 101, and a displaying optical system including: a light modulation device 105; a polarization beam splitter 106; and a projection lens 107. The illumination device 101 is provided with a red laser source 101R, a green laser source 101G, a blue laser source 101B, dichroic mirrors 102R, 102G, and 102B, a collimator lens 103, and a fly-eye lens 104.

In the display unit 100 according to the comparative example, laser lights of respective colors emitted from the red, the green, and the blue laser sources 101R, 101G, and 101B are subjected to color composition (light path unification) by the dichroic mirrors 102R, 102G, and 102B, respectively, and then enter the collimator lens 103. The lights incident on the collimator lens 103 are respectively collimated by the collimator lens 103 to become the parallel lights, following which the parallel lights are uniformized by the fly-eye lens 104 (an intensity distribution within a plane is uniformized), and exit therefrom as illumination light. The illumination light then enters the light modulation device 105 through the polarization beam splitter 106. The illumination light having entered the light modulation device 105 is reflected while being modulated based on picture signals, so as to exit therefrom as picture light. The picture light is projected (projected in an enlarged fashion) onto the screen 30 by the projection lens 107, by which color picture displaying based on the picture signals is performed in the display unit 100.

Thus, a large-scaled (large-sized) optical system (a light path unifying optical system) has to be constructed in the illumination device 101, in order to perform the light path unification (the color composition) of the lights emitted respectively from the red, the green, and the blue laser sources 101R, 101G, and 101B and to use those lights for picture displaying. More specifically, the light path unifying optical system (the dichroic mirrors 102R, 102G, and 102B in this comparative example) having a size corresponding to the number of the light sources has to be used, or the number of the light path unifying optical systems has to correspond to the number of the light sources. One reason is that it is necessary in the light path unifying optical system to have a size for allowing light having a high numerical aperture (a high aperture ratio) to be introduced therein or to be incident thereon, in order to avoid a decrease in a light-use efficiency (to avoid a light loss) in performing the light path unification. Thus, in the illumination device 100 according to the comparative example, it is difficult to achieve reduction in size and weight while improving the light-use efficiency. It is to be noted that, although the comparative example uses the dichroic mirrors for the light path unifying optical system, the same is true for a comparative example in which dichroic prisms are used.

Also, in general, a pattern having spots which is not seen in normal light is observable when irradiating coherent light such as laser light onto a diffusion plane. Such a pattern is often referred to as a speckle pattern, which occurs due to a mutual interference, based on a random phase-relationship corresponding to microscopic asperity (irregularity) on the plane, of lights scattered at respective points on the diffusion plane.

In a projector that utilizes laser light sources as in the display unit 100 according to the comparative example, the speckle pattern (the interference pattern) is superimposed on a display image on the screen. Thus, for human eyes, the speckle pattern is recognized as a strong random noise if no measures are taken, consequently decreasing the display quality.

2-2. Present Embodiment

In contrast, the illumination device 1 according to the first embodiment addresses the issues discussed above as follows.

[Operations of Collimator Lenses 12R, 12G, and 12B, and Expander Lens 16]

In the illumination device 1, the respective incident lights derived from the three kinds of laser sources (the red, the green, and the blue laser sources 11R, 11G, and 11B) in the light source section are converted individually into the parallel lights by the collimator lenses 12R, 12G, and 12B. Then, the light path unification is performed in the dichroic prisms 131 and 132 on the respective parallel lights. Thus, in the illumination device 1, the beam diameters in performing the light path unification become small. Hence, it is possible to allow the light path unifying optical system (the dichroic prisms 131 and 132 in this embodiment) to be small in size (see FIG. 1) while maintaining high light-use efficiency, as compared with a case (such as the comparative example discussed above) where the exit lights from the three kinds of light sources, which are diffusion lights or divergent lights, are subjected "as they are" to the light path unification. In particular, the first embodiment advantageously achieves further reduction in size of the dichroic prisms 131 and 132 as compared with a second embodiment to be described later, since the parallel light is employed rather than the diffusion light or the divergent light.

Also, in the illumination device 1, each parallel light following the light path unification is subjected to the expansion of the beam diameter thereof in the expander lens 16. Thereafter, each parallel light enters the fly-eye lens 17, by which the in-plane intensity distribution is uniformized. Thus, the beam diameters are expanded when uniformizing the in-plane intensity distribution. Hence, the in-plane intensity distribution is uniformized further effectively (i.e., improves the degree of uniformizing the in-plane intensity distribution), as compared with a case where the light passes through a plurality of cells (lenses) in the fly-eye lens 17 to be subjected to the uniformizing process in a state in which the beam diameter thereof is small (the in-plane intensity distribution is uniformized without expanding the beam diameters).

[Function of Reducing Interference Pattern]

Further, in the illumination device 1, the driving section 15 performs the microvibration of the optical element 14 through which each laser light passes. For example, the driving section 15 oscillates (performs the microvibration of) the optical element 14 in a predetermined direction within a plane orthogonal to the optical axis Z0, or oscillates or performs the microvibration of the optical element 14 along the optical axis Z0. This achieves multiplexing (time-averaging) of the speckle pattern on an incident plane of the fly-eye lens 17, and thereby reduces the generation of the speckle noise (the interference pattern) caused by the laser light. This is based on the principle wherein human eyes and brain hardly discriminate flickers of images within a range from about 20 milliseconds to about 50 milliseconds, meaning that the images within that time range are integrated and averaged in the human eyes. Hence, the plurality of independent speckle patterns are superimposed within the time range to thereby average the speckle noises to an extent in which the speckle noises do not or hardly disturb the human eyes.

Also, in the illumination device 1, the multiplexing of the speckle patterns are performed by the optical element 14, at the time when the beam diameters are narrowed by the collimator lenses 12R, 12G, and 12B and before the beam diameters are expanded by the expander lens 16. In other words, the optical element 14 is located at a position which is on the light paths and on the exit side of each of the dichroic prisms 131 and 132 (more specifically, on the light paths between the dichroic prism 132 and the expander lens 16). This allows the beam diameter (effective diameter) of each laser light entering the optical element 14 to be also small, making it possible to use a small-sized optical element for the optical element 14. Hence, the first embodiment advantageously achieves reduction in size of the illumination device 1 and the display unit 3 in this respect as well.

According to the first embodiment, each of the lights entered from the plural kinds of light sources (the red, the green, and the blue laser sources 11R, 11G, and 11B) in the light source section are converted individually into the parallel light, following which the light path unification is performed on each of the parallel lights. Thus, it is possible to allow the light path unifying optical system (the dichroic prisms 131 and 132 in this embodiment) to be small in size while maintaining high light-use efficiency. Also, the beam diameters of the respective parallel lights following the light path unification are expanded, and the in-plane intensity distribution is uniformized thereafter. Thus, it is possible to more effectively uniformize the in-plane intensity distribution. Therefore, it is possible to effectively reduce a luminance non-uniformity of the illumination light while achieving a smaller size and improving the light-use efficiency (i.e., improvement of the display quality is possible).

Modifications

Hereinafter, modifications (a first modification and a second modification) of the first embodiment described above will be described. Note that the same or equivalent elements as those of the first embodiment described above are denoted with the same reference numerals, and will not be described in detail.

First Modification

Figure 3:
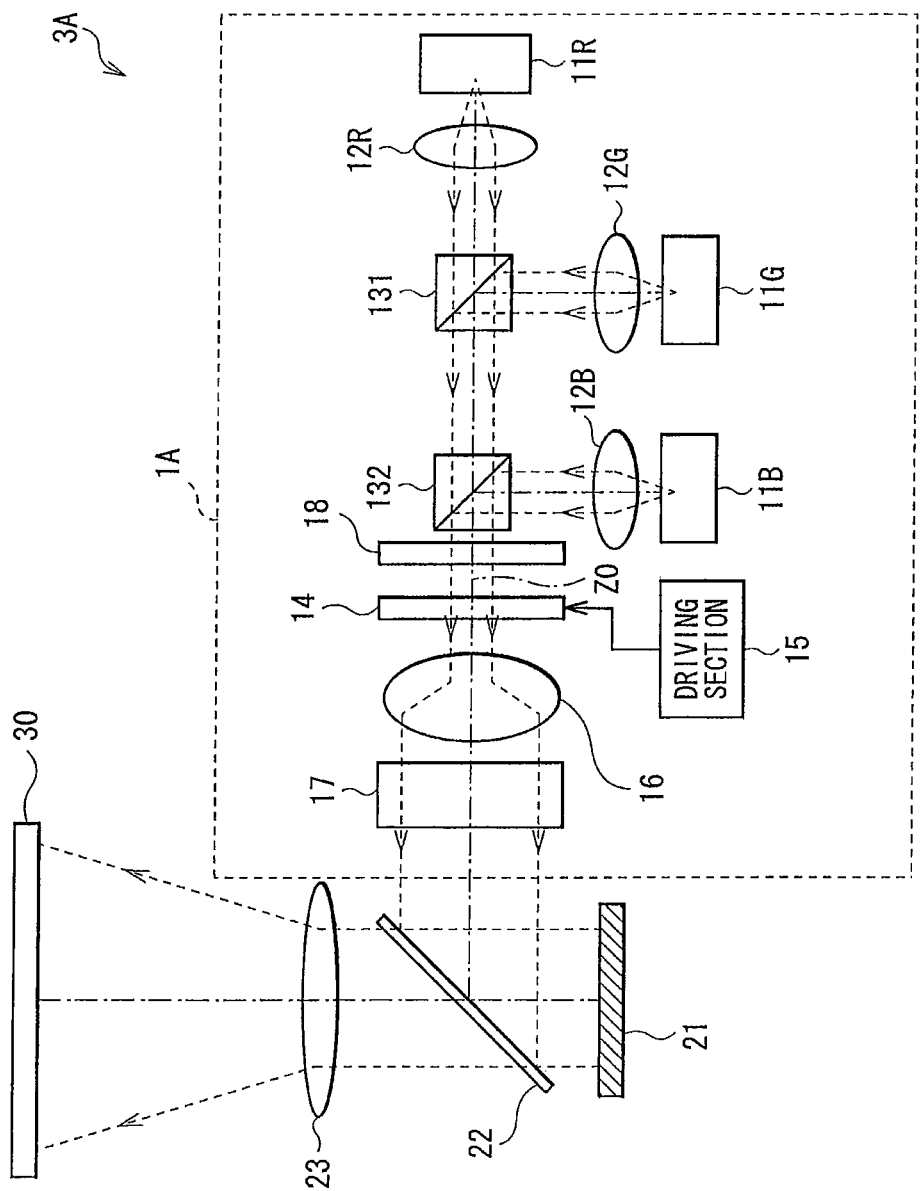
FIG. 3 illustrates an overall configuration of a display unit according to a first modification of the first embodiment.

FIG. 3 illustrates an overall configuration of a display unit (a display unit 3A) according to a first modification. As in the display unit 3 of the first embodiment described above, the display unit 3A according to the first modification is a projection display unit which projects picture light onto the screen 30. The display unit 3A is provided with an illumination device 1A, and a displaying optical system (the polarization beam splitter 22, the reflection liquid crystal device 21, and the projection lens 23) which is similar to that of the display unit 3.

[Configuration of Illumination Device 1A]

The illumination device 1A has a configuration similar to that of the illumination device 1 according to the first embodiment, except that a retarder 18 is further provided on the light paths between the dichroic prism 132 and the optical element 14.

The retarder 18 serves to vary two kinds of polarization directions and thereby bring those polarization directions close to each other, when there are two kinds of polarization directions for each of the exit lights derived from the red laser source 11R, the green laser source 11G, and the blue laser source 11B. In particular, in the first modification, the retarder 18 selectively varies the two kinds of polarization directions, to thereby allow those polarization directions to coincide with each other after transmitting the retarder 18.

[Operations and Advantages of Illumination Device 1A]

Figure 4A:
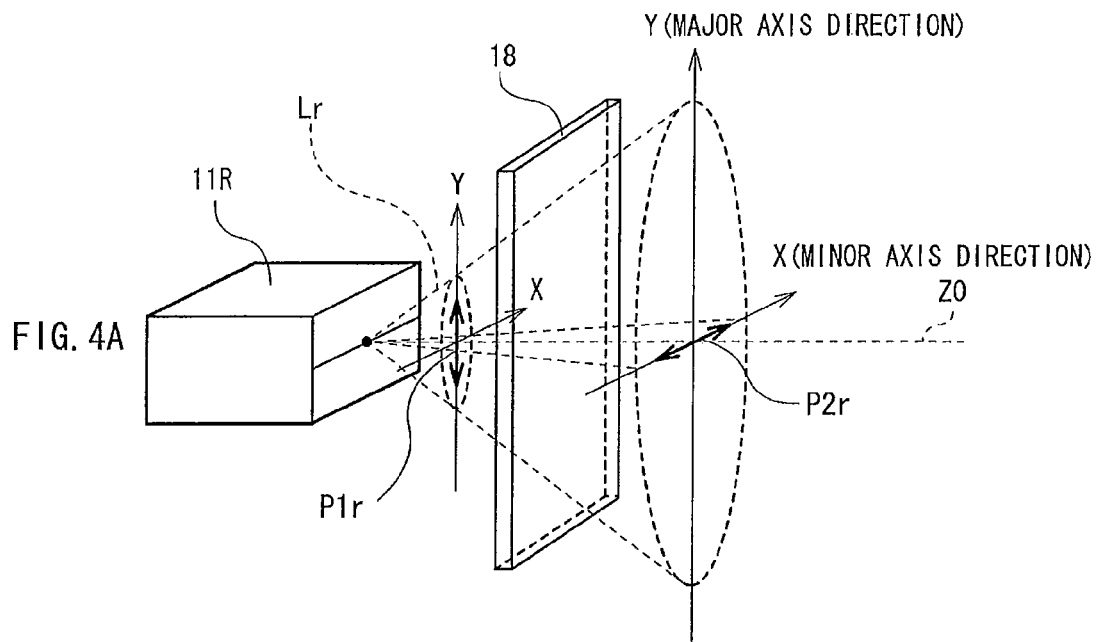
FIGS. 4A and 4B are schematic perspective views for describing an operation of a retarder illustrated in FIG. 3.
Figure 4B:
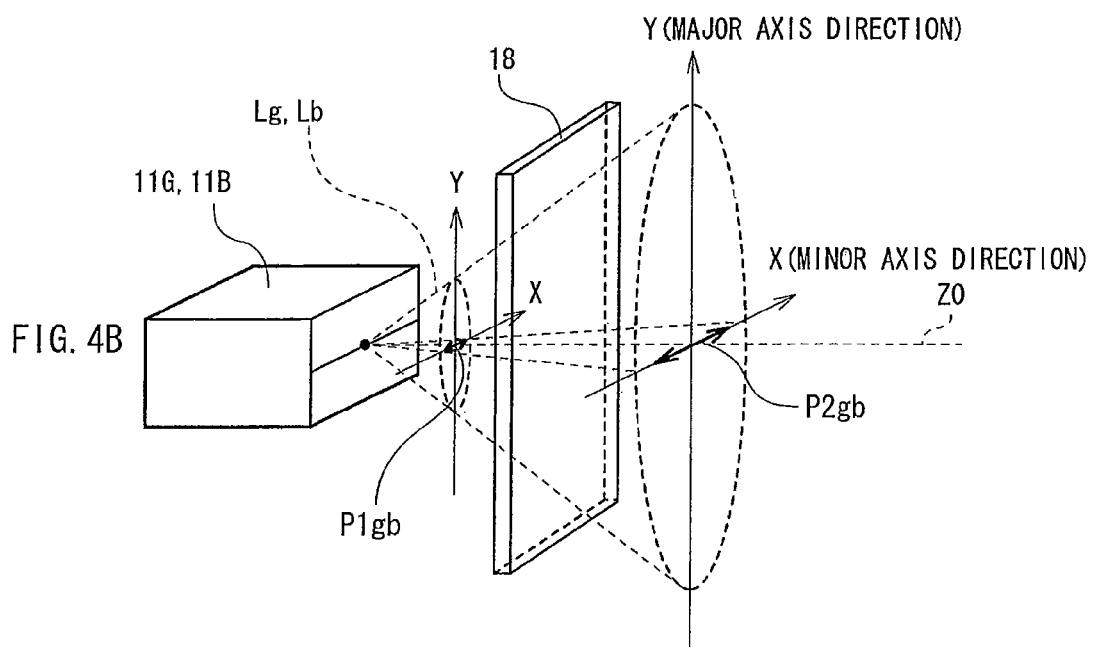

As illustrated in FIGS. 4A and 4B, each of the laser lights emitted from the red laser source 11R, the green laser source 11G, and the blue laser source 11B exhibit a far-field pattern (FFP) having a shape with an in-plane anisotropy (such as an elliptical shape in this modification), for example. That is, the laser light emitted from each of the laser sources has an in-plane anisotropy in coherence. In this modification, a shape of the FFP in each of red laser light Lr, green laser light Lg, and blue laser light Lb is an ellipse having a minor axis in an X-direction and a major axis in a Y-direction in an XY plane. In other words, the red, the green, and the blue laser sources 11R, 11G, and 11B are so disposed that, in each of the laser lights thereof, an axial direction expressing a high coherence overlaps or coincides with the X-direction and that an axial direction expressing a low coherence overlaps or coincides with the Y-direction.

Thus, in the first modification, the red, the green, and the blue laser sources 11R, 11G, and 11B are so arranged that directions of major axes of the FFPs in the exit lights derived from the respective laser sources coincide with one another, by which the following advantages are achieved in the illumination device 1A. For example, a loss of light is reduced in a case where a lens having an I-cut shape (a lens cut to have an alphabet "I" shape) is used. In an embodiment where the I-cut-shaped lens is used, an optical effective range may be sacrificed in portions subjected to "I-cut" (portions cut to form the alphabet "I" shape). However, the light loss is advantageously reduced by matching the major axis direction in a radiation angle of the laser light with a direction to which the "I-cut" is performed (a direction in which an effective diameter is wide).

Further, in the first modification, the retarder 18, which will be described later in detail, is provided in the illumination device 1A. Thus, even when there are two kinds of polarization directions for the lights exited from the respective light sources, those polarization directions are brought close to each other (or allowed to coincide with each other in the first modification). In other words, even when the light beams exited from the light sources includes two kinds of light beams in which one of the two light beams is polarized in a first polarization direction and the other is polarized in a second polarization direction, the retarder 18 allows the first and the second polarization directions to be varied and to be brought closer to each other, or allows the first and the second polarization directions to be selectively varied and to substantially coincide with each other.

Referring to FIGS. 4A and 4B, the red laser light Lr emitted from the red laser source 11R and the green and the blue laser lights Lg and Lb emitted from the green and the blue laser sources 11G and 11B differ from each other in terms of polarization directions P1r and P1gb immediately following the emission. More specifically, in this modification, the polarization direction P1r of the red laser light Lr is in the major axis direction (in a Y-axis direction) of the FFP shape as illustrated in FIG. 4A, whereas the polarization direction P1gb of each of the green laser light Lg and the blue laser light Lb is in the minor axis direction (in an X-axis direction) of the FFP shape as illustrated in FIG. 4B. Thus, the following issue may occur if no measures are taken in a case where, even though the FFP shapes of the laser lights coincide with one another, the polarization directions thereof differ (in this modification, two kinds of polarization directions are present) as described above. That is, for example, when a combination of the reflection liquid crystal device 21 and the polarization beam splitter 22 is used to perform a light modulation operation as in the display unit 3A of the first modification, the modulation operation may not be addressed because it is necessary to allow the polarization directions among the laser lights of the respective colors to coincide with one another.

To address this, in the first modification, the retarder 18 varies two kinds of polarization directions when there are two kinds of polarization directions for the exit lights derived from the red laser source 11R, the green laser source 11G, and the blue laser source 11B, and brings those polarizations close to each other. In particular, the first modification selectively varies those two kinds of polarization directions to allow those polarization directions to coincide with each other after transmitting the retarder 18. In the first modification, the retarder 18 acts as, for the red laser light Lr whose polarization direction P1r expresses the major axis direction (the Y-axis direction) of the FFP shape, a half wavelength plate that rotates the polarization direction thereof by 90 degrees, as illustrated in FIG. 4A. This allows the polarization direction P2r of the red laser light Lr following the passage of the retarder 18 to express the minor axis direction (the X-axis direction) of the FFP shape. On the other hand, for the green laser light Lg and the blue laser light Lb each of whose polarization direction P2r originally expresses the minor axis direction (the X-axis direction) of the FFP shape, the retarder 18 does not act thereon (the retarder 18 does not vary the polarization directions thereof), as illustrated in FIG. 4B. Thus, the green laser light Lg and the blue laser light Lb following the passage of the retarder 18 have, as they are, the polarization directions P2gb each expressing the minor axis direction (the X-axis direction) of the FFP shape.

Thus, the red laser light Lr, the green laser light Lg, and the blue laser light Lb following the passage through the retarder 18 are adapted such that the polarization directions P2r and P2gb thereof coincide with one another (for example, in the X-axis direction). Hence, the first modification makes it possible to address the case where the combination of the reflection liquid crystal device 21 and the polarization beam splitter 22 is used to perform the light modulation operation as discussed above.

Second Modification

Figure 5:
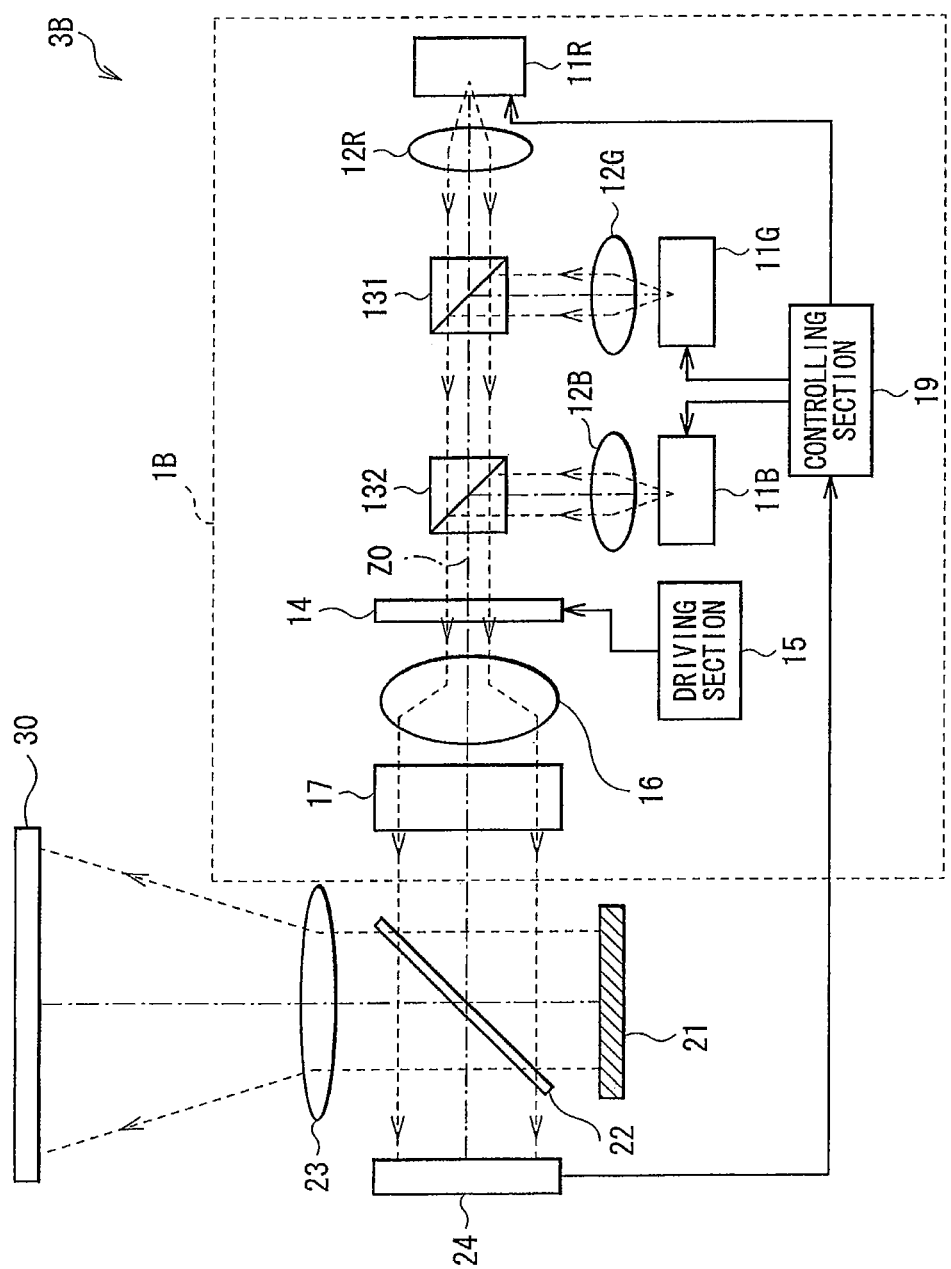
FIG. 5 illustrates an overall configuration of a display unit according to a second modification of the first embodiment.

FIG. 5 illustrates an overall configuration of a display unit (a display unit 3B) according to a second modification. As in the display unit 3 of the first embodiment described above, the display unit 3B according to the second modification is a projection display unit which projects picture light onto the screen 30. The display unit 3B is provided with an illumination device 1B, a displaying optical system (the polarization beam splitter 22, the reflection liquid crystal device 21, and the projection lens 23) which is similar to that of the display unit 3, and a front monitor 24 (a light detecting section) described below.

The front monitor 24 is disposed at the back of the polarization beam splitter 22 (i.e., disposed on the opposite side of the illumination device 1B on the optical axis Z0). The front monitor 24 serves as a light detecting section which detects the illumination light derived from the illumination device 1B (detects the exit light derived from the fly-eye lens 17), and monitors a light quantity ratio of the respective color lights (the red laser light, the green laser light, and the blue laser light) in the illumination light. Also, in the second modification, the front monitor 24 may detect unnecessary light or "undesirable light" which is a part of the illumination light derived from the illumination device 1B, in particular. More specifically, the front monitor 24 performs a light detection of one of the polarizations in the illumination light entering the polarization beam splitter 22 that is not reflected toward the reflection liquid crystal device 21 (the one which transmits through the polarization beam splitter 22), as the undesirable light which is not used for the displaying. This allows to perform the light detection for controlling the light quantity described below, while avoiding unnecessary decrease in luminance in the illumination light (the picture light).

The illumination device 1B has a configuration similar to that of the illumination device 1 according to the first embodiment, except that a controlling section 19 is further provided. The controlling section 19 controls, based on a result of the detection by the front monitor 24 (the detection result of the light quantity ratio of the respective color lights in the illumination light), the light quantity ratio of the exit lights among the plural kinds of light sources (the red laser source 11R, the green laser source 11G, and the blue laser source 11B, for example). For example, the controlling section 19 so controls the light quantity ratio of the red laser light, the green laser light, and the blue laser light emitted from the light sources that the light quantity ratio is at a desired value (a constant value). The controlling section 19 can be a microcomputer, for example.

Thus, in the display unit 1B according to the second modification, the front monitor 24 detects the illumination light derived from the illumination device 1B, and the controlling section 19 controls, based on the detection result obtained by the front monitor 24, the light quantity ratio of the exit lights among the plural kinds of light sources. Hence, it is possible to keep chromaticity points of the illumination light constant, and to further improve the display quality.

In the second modification, the controlling section 19 is provided inside of the illumination device 1B. Alternatively, the controlling section 19 may be provided outside of the illumination device 1B. Also, although the front monitor 24 is provided outside of the illumination device 1B in the second modification, the front monitor 24 may be provided inside of the illumination device 1B.

Second Embodiment

Hereinafter, a second embodiment will be described. Note that the same or equivalent elements as those of the first embodiment described above are denoted with the same reference numerals, and will not be described in detail.

[Overall Configuration of Display Unit 3C]

Figure 6:
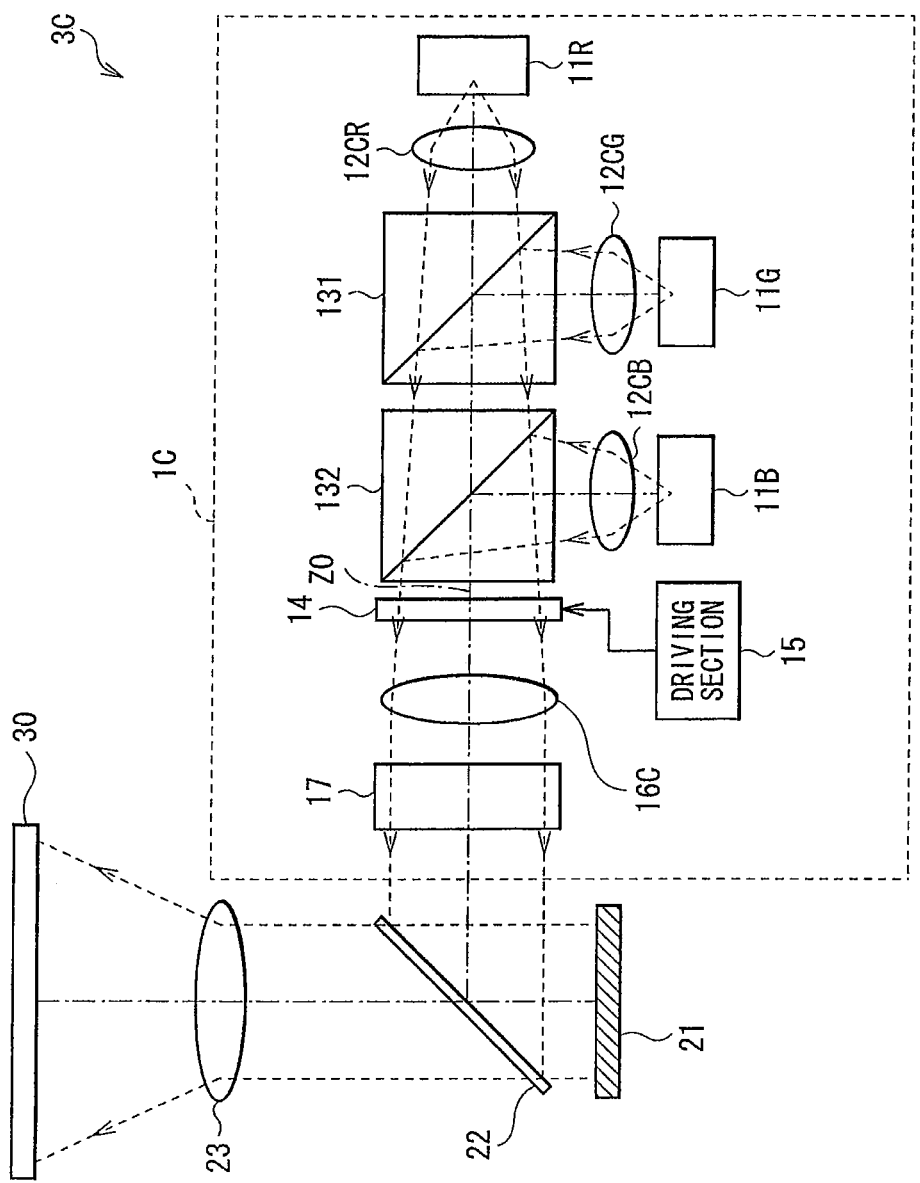
FIG. 6 illustrates an overall configuration of a display unit according to a second embodiment.

FIG. 6 illustrates an overall configuration of a display unit (a display unit 3C) according to the second embodiment. As in the display unit 3 of the first embodiment described above, the display unit 3C according to the second embodiment is a projection display unit which projects picture light onto the screen 30. The display unit 3C is provided with an illumination device 1C, and a displaying optical system (the polarization beam splitter 22, the reflection liquid crystal device 21, and the projection lens 23) which is similar to that of the display unit 3.

[Illumination Device 1C]

The illumination device 1C is provided with the red laser source 11R, the green laser source 11G, the blue laser source 11B, coupling lenses 12CR, 12CG, and 12CB, the dichroic prisms 131 and 132, the optical element 14, the driving section 15, a collimator lens 16C, and the fly-eye lens 17. In other words, the illumination device 1C differs from the illumination device 1 according to the first embodiment, in that the coupling lenses 12CR, 12CG, and 12CB are provided instead of the collimator lenses 12R, 12G, and 12B, and the collimator lens 16C is provided instead of the expander lens 16.

The coupling lenses 12CR and 12CG serve to allow the red laser light emitted from the red laser source 11R and the green laser light emitted from the green laser source 11G to exit therefrom individually as divergent lights while reducing beam diameters thereof, respectively, and couple those divergent lights to the dichroic prism 131. Likewise, the coupling lens 12CB serves to allow the blue laser light emitted from the blue laser source 11B to exit therefrom as divergent light while reducing a beam diameter thereof, and couple the divergent light to the dichroic prism 132. That is, the coupling lenses 12CR, 12CG, and 12CB serve to allow the respective incident lights (the red, the green, and the blue laser lights) derived from the three types of laser sources (the red, the green, and the blue laser sources 11R, 11G, and 11B) to exit therefrom individually as the divergent lights while reducing the beam diameters thereof, respectively. In other words, the coupling lenses 12CR, 12CG, and 12CB reduce beam divergence ratios of the light beams entered from the light sources, and allow the ratio-reduced light beams to exit therefrom as the divergent light beams, respectively. Thus, the illumination device 1C has the same number of coupling lenses (three coupling lenses 12CR, 12CG, and 12CB in this embodiment although not limitative) as that of the light sources (three in this embodiment although not limitative). In one embodiment, the coupling lenses 12CR, 12CG, and 12CB correspond to an illustrative example of a "coupling optical system".

The dichroic prisms 131 and 132 are basically similar to those described with reference to the first embodiment, but differ therefrom in that, in this embodiment, the dichroic prisms 131 and 132 perform the light path unification on the divergent lights exited from the coupling lenses 12CR, 12CG, and 12CB, as illustrated in FIG. 6.

The collimator lens 16C is disposed on the light paths between the optical element 14 and the fly-eye lens 17, and serves to collimate (convert into parallel lights or "parallelize") the lights exited from the optical element 14. In other words, the collimator lens 16C allows the respective divergent lights following the light path unification in the dichroic prisms 131 and 132 to exit therefrom as parallel lights. This enables the parallel lights, each of which is now large in the beam diameter due to the fact that those parallel lights are formerly the divergent lights, to enter the fly-eye lens 17. The collimator lens 16C corresponds to an illustrative example of a "parallelizing optical system" in one embodiment.

The fly-eye lens 17 is basically similar to that described with reference to the first embodiment, but differ therefrom in that, in this embodiment, the fly-eye lens 17 uniformizes an in-plane intensity distribution of each of the parallel lights exited from the collimator lens 16C.

[Operations and Advantages of Display Unit 3C]

In the display unit 3C according to the second embodiment, the incident lights derived from the three kinds of laser sources (the red, the green, and the blue laser sources 11R, 11G, and 11B) in the light source section are converted individually into the divegent lights while being reduced in the beam diameters thereof by the coupling lenses 12CR, 12CG, and 12CB, respectively, in the illumination device 1C. Then, the light path unification is performed in the dichroic prisms 131 and 132 on the respective divergent lights. Thus, in the illumination device 1C, the beam diameters in performing the light path unification are smaller than those according to the comparative example described above, as in the illumination device 1 of the first embodiment. Hence, it is possible to allow the light path unifying optical system (the dichroic prisms 131 and 132 in this embodiment) to be small in size (see FIG. 6) while maintaining high light-use efficiency, as compared with a case (such as the comparative example discussed above) where the exit lights from the three kinds of light sources are subjected to the light path unification without involving the coupling lenses 12CR, 12CG, and 12CB described above.

Also, in the illumination device 1C, each divergent light following the light path unification is converted into the parallel light in the collimator lens 16C. Thereafter, each parallel light enters the fly-eye lens 17, by which the in-plane intensity distribution is uniformized. Thus, in uniformizing the in-plane intensity distribution, the lights subjected thereto are the parallel lights which have been increased further in the beam diameters. Hence, the in-plane intensity distribution is uniformized further effectively (i.e., improves the degree of uniformizing the in-plane intensity distribution), as compared with a case where the light passes through a plurality of cells (lenses) in the fly-eye lens 17 to be subjected to the uniformizing process in a state in which the beam diameter thereof is small (in a state in which the lights do not travel as the diffusion lights or the divergent lights).

Further, in the illumination device 1C, the driving section 15 performs the microvibration of the optical element 14 through which each laser light passes, as in the illumination device 1. Thus, the generation of the speckle noise (the interference pattern) caused by the laser light is reduced by the principle similar to that according to the first embodiment. Also, in the second embodiment, the respective laser lights that pass through the optical element 14 are the divergent lights as illustrated in FIG. 6. Thus, not only positions on which the laser lights are incident but also angles of incidence vary when the optical element 14 oscillates. That is, an angular component is present in addition to a position component in a beam shift which occurs in the oscillation of the optical element 14. Hence, as compared with the first embodiment, the second embodiment makes it possible to further reduce the generation of the speckle noise (the interference pattern) by an amount corresponding to the variation in the incident angles (by an amount corresponding to the angular component in the beam shift) mentioned above.

According to the second embodiment, each of the incident lights derived from the plural kinds of light sources (the red, the green, and the blue laser sources 11R, 11G, and 11B) in the light source section are converted individually into the divergent light while reducing the beam diameter thereof, following which the light path unification is performed on each of the divergent lights. Thus, it is possible to allow the light path unifying optical system (the dichroic prisms 131 and 132 in this embodiment) to be small in size while maintaining high light-use efficiency. Also, the in-plane intensity distribution is uniformized after the respective divergent lights following the light path unification are converted into the parallel lights. Thus, it is possible to more effectively uniformize the in-plane intensity distribution. Therefore, it is possible to effectively reduce the luminance non-uniformity of the illumination light while achieving a smaller size and improving the light-use efficiency (i.e., improvement of the display quality is possible).

It is to be noted that the configurations described in the first and the second modifications are applicable to and may be combined with the illumination device 1C and the display unit 3C according to the second embodiment.

Other Modifications

In the embodiments and the modifications described above, the fly-eye lens is described as one example of the "uniformizing optical system", although it is not limited thereto. Alternatively, an optical member other than the fly-eye lens, such as, but not limited to, a rod-integrator may be used.

Also, in the embodiments and the modifications described above, the plural kinds of light sources (for red, for green, and for blue, although the types of colors and the number of the colors are not limited thereto) are each configured by the laser light source, although it is not limited thereto. It is sufficient for the light source section to have the configuration in which one or more of the plural kinds of light sources is (are) configured by the laser light source. In one embodiment, a combination of the laser light source and another light source (such as LEDs, although it is not limited thereto) may be provided in the light source section.

Moreover, in the embodiments and the modifications described above, the reflection liquid crystal device serves as the light modulation device, although it is not limited thereto. Alternatively, a transmission crystal liquid device, or optical modulation element other than a liquid crystal device, for example, may be used.

In the embodiments and the modifications described above, three kinds of light sources that emit lights having different wavelengths are used, although it is not limited thereto. Alternatively, two or four or more types of light sources, for example, may be used instead of three light sources.

Furthermore, although the respective elements (optical systems) of the illumination devices and those of the display units have been specifically described in the embodiments and the modifications described above, it is not necessary to include all of the elements, or other elements may be further included. For example, dichroic mirrors may be provided instead of the dichroic prisms 131 and 132 described in the embodiments and the modifications as the "light path unifying optical system". Also, optionally, the optical element 14 may not be provided in the illumination device.

The embodiments and the modifications described above each includes the projection optical system (the projection lens) by which the light modulated by the light modulation device is projected, and are thus each configure the projection display unit, although it is not limited thereto. The embodiments and the modifications according to the technology are applicable also to a display unit such as a direct-view display unit.

Also, in the embodiments and the modifications described above, the use of the illumination device is directed to the projection display unit, although it is not limited thereto. The embodiments and the modifications according to the technology are applicable also to other devices such as an exposure system including a stepper, for example.

The terms "light" and "lights" as used herein may, where appropriate, be used interchangeably with the terms "light beam" and "light beams", respectively.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An illumination device comprising:
   a light source section having plural kinds of light sources, the light sources emitting light beams having different wavelengths;
   a parallelizing optical system for parallelizing each of the light beams entered from the light sources, and for allowing each of the parallelized light beams to exit therefrom;
   a light path unifying optical system for unifying the parallelized light beams exited from the parallelizing optical system into a single light path;
   an expanding optical system for expanding a beam diameter of each of the parallelized light beams unified into the single light path, and for allowing each of the expanded and parallelized light beams to exit therefrom;
   a uniformizing optical system for uniformizing an in-plane intensity distribution in each of the expanded and parallelized light beams exited from the expanding optical system; and
   a retarder,
   wherein each of the light beams exited from the light sources exhibit a far-field pattern having a shape with an in-plane anisotropy,
   wherein directions of major axes of the far-field patterns in the light beams exited from the light sources substantially coincide with one another,
   wherein the light beams exited from the light sources includes two kinds of light beams, one of the two kinds of light beams being polarized in a first polarization direction and the other being polarized in a second polarization direction, and
   wherein the retarder allows the first and the second polarization directions to be varied and to be brought closer to each other.

2. The illumination device according to claim 1, further comprising:
   an optical element for allowing a laser beam to pass therethrough; and
   a driving section for oscillating the optical element,
   wherein one or more of the light sources includes a laser light source for emitting the laser beam.

3. The illumination device according to claim 2, wherein the optical element is disposed on a light path on an exit side of the light path unifying optical system.

4. The illumination device according to claim 3, wherein the optical element is disposed on the light path between the light path unifying optical system and the expanding optical system.

5. The illumination device according to claim 1, wherein the retarder allows the first and the second polarization directions to be selectively varied and to substantially coincide with each other.

6. The illumination device according to claim 1, further comprising:
   a light detecting section for detecting the light beams exited from the uniformizing optical system; and
   a controlling section for controlling, based on a detection result from the light detecting section, a light quantity ratio between the light beams exited from the light sources.

7. The illumination device according to claim 5, wherein the light detecting section detects undesired light included in the light beams exited from the uniformizing optical system.

8. The illumination device according to claim 1, wherein the parallelizing optical system includes collimator lenses, the number of the collimator lenses being the same as the number of the light sources.

9. The illumination device according to claim 1, wherein the light path unifying optical system includes a dichroic prism or a dichroic mirror.

10. The illumination device according to claim 1, wherein the expanding optical system includes an expander lens.

11. The illumination device according to claim 1, wherein the uniformizing optical system includes a fly-eye lens.

12. The illumination device according to claim 1, wherein the light source section includes three light sources each emitting red light, green light, or blue light.

13. The illumination device according to claim 12, wherein one or more of the three light sources includes a laser light source.

14. An illumination device, comprising:
   a light source section having plural kinds of light sources, the light sources emitting light beams having different wavelengths;
   a coupling optical system for reducing a beam divergence ratio of each of the light beams entered from the light sources, and allowing each of the ratio-reduced light beams to exit therefrom as divergent light beams;
   a light path unifying optical system for unifying the divergent light beams exited from the coupling optical system into a single light path;
   a parallelizing optical system for parallelizing each of the divergent light beams exited from the light path unifying optical system, and for allowing each of the parallelized light beams to exit therefrom; and a uniformizing optical system for uniformizing an in-plane intensity distribution in each of the parallelized light beams exited from the parallelizing optical system.

15. A display unit comprising:

an illumination device for emitting illumination light; and a light modulation device for modulating, based on a picture signal, the illumination light derived from the illumination device, the illumination device including:
- a light source section having plural kinds of light sources, the light sources emitting light beams having different wavelengths;
- a coupling optical system for reducing a beam divergence ratio of each of the light beams entered from the light sources, and for allowing each of the ratio-reduced light beams to exit therefrom as divergent light beams;
- a light path unifying optical system for unifying the divergent light beams exited from the coupling optical system into a single light path;
- a parallelizing optical system for parallelizing each of the divergent light beams exited from the light path unifying optical system, and for allowing each of the parallelized light beams to exit therefrom; and
- a uniformizing optical system for uniformizing an in-plane intensity distribution in each of the parallelized light beams exited from the parallelizing optical system.

* * * * *